United States Patent [19]
Davis

[11] Patent Number: 5,966,446
[45] Date of Patent: *Oct. 12, 1999

[54] TIME-BRACKETING INFRASTRUCTURE IMPLEMENTATION

[75] Inventor: Derek L. Davis, Phoenix, Ariz.

[73] Assignee: Intel Corporation, Santa Clara, Calif.

[ * ] Notice: This patent is subject to a terminal disclaimer.

[21] Appl. No.: 08/886,092

[22] Filed: Jun. 30, 1997

Related U.S. Application Data

[63] Continuation-in-part of application No. 08/795,452, Feb. 4, 1997, Pat. No. 5,751,809, and a continuation of application No. 08/538,189, Sep. 29, 1995, abandoned.

[51] Int. Cl.⁶ .................................................. H04K 1/00
[52] U.S. Cl. ............................ 380/25; 380/4; 380/23; 380/30; 380/49
[58] Field of Search ................................ 380/23, 25, 3, 380/4

[56] References Cited

U.S. PATENT DOCUMENTS

| | | | |
|---|---|---|---|
| 5,005,200 | 4/1991 | Fischer | 380/30 |
| 5,136,646 | 8/1992 | Haber et al. | 380/23 |
| 5,136,647 | 8/1992 | Haber et al. | 380/23 |
| 5,189,700 | 2/1993 | Blandford | 380/23 |
| 5,321,749 | 6/1994 | Virga | 380/18 |
| 5,422,953 | 6/1995 | Fischer | 380/23 |
| 5,499,294 | 3/1996 | Friedman | 380/10 |
| 5,751,809 | 5/1998 | Davis et al. | 380/23 |
| 5,764,769 | 6/1998 | Bennett et al. | 380/23 |
| 5,828,751 | 10/1998 | Walker et al. | 380/25 |

Primary Examiner—Tod R. Swann
Assistant Examiner—Trevor Coddington
Attorney, Agent, or Firm—Blakely, Sokoloff, Taylor & Zafman

[57] ABSTRACT

Implemented preferably within a digital camera, an electronic device is used to prevent a captured data clip from being fraudulently altered without detection. The electronic device performs "time-bracketing" and may contain cellular phone circuitry to establish wireless communication to receive a state value used to preserve data integrity when time-stamping is performed in combination.

21 Claims, 6 Drawing Sheets

TIME-BRACKETING INFRASTRUCTURE IMPLEMENTATION

CROSS-REFERENCES TO RELATED APPLICATIONS

This is a Continuation-in-Part of U.S. Ser. No. 08/795,452, filed Feb. 4, 1993, now U.S. pat. No. 5,751,809, issued May 12, 1998, which is a Continuation of U.S. patent application Ser. No. 08/538,189, filed Sep. 29, 1995, now abandoned.

BACKGROUND OF THE INVENTION

1. Field of the Invention

The present invention relates to an apparatus and method for data security. More particularly, the present invention relates to an electronic device and corresponding method of maintaining the integrity of data.

2. Description of Art Related to the Invention

For data security to be highly reliable, it must preserve the "integrity" of data transmitted between two sources. This may be accomplished through a mechanism that determines the data's origin in order to detect whether the data has been illicitly corrupted and to establish when the data was created.

Currently, access control techniques, such as biometrics for example, are failing to preserve data integrity. In general, biometrics involve digitally scanning a characteristic of the user (e.g., finger print, iris, retina, etc.) to capture one and more frames of data (generally referred to as "data clip") associated with the characteristic. Then, the captured data clip is compared to a previously stored master. If certain characteristics of the captured data clip match those of the stored master, the user is identified and/or authenticated.

The reason that access control techniques are failing to preserve data integrity is that electronic technology has become so sophisticated that alteration of a digitally captured data clip is difficult to detect. For example, security systems using biometrics are now susceptible to fraudulent alteration of the captured data clip if the biometric system is not physically connected to a system or component that processes or stores the captured data clip. Usually, this is due to the fact that the communication path is publicly accessible which allows interlopers an opportunity for the captured data clip to be (i) substituted for a prior recorded data clip, (ii) substituted with another data clip transferred in real-time from another location, or (iii) combined with other non-existent images or characteristics.

In fact, our society is beginning to doubt the integrity of images transferred or stored as data clips because these data clips can be easily manipulated. Unless the integrity of the data is preserved, more cases of fraud will be committed, creating distrust between persons. For example, it is foreseeable that insurance companies will begin to distrust and contest claims of property damage where a hardcopy image formed by a data clip (e.g., a photograph from a digital camera) is used by a member of the real-estate industry to appraise and insure property prior to its damage. Likewise, it is foreseeable that hardcopy images formed by a data clip will become inadmissible in court due to their susceptibility to fraudulent modification.

Figure 1:
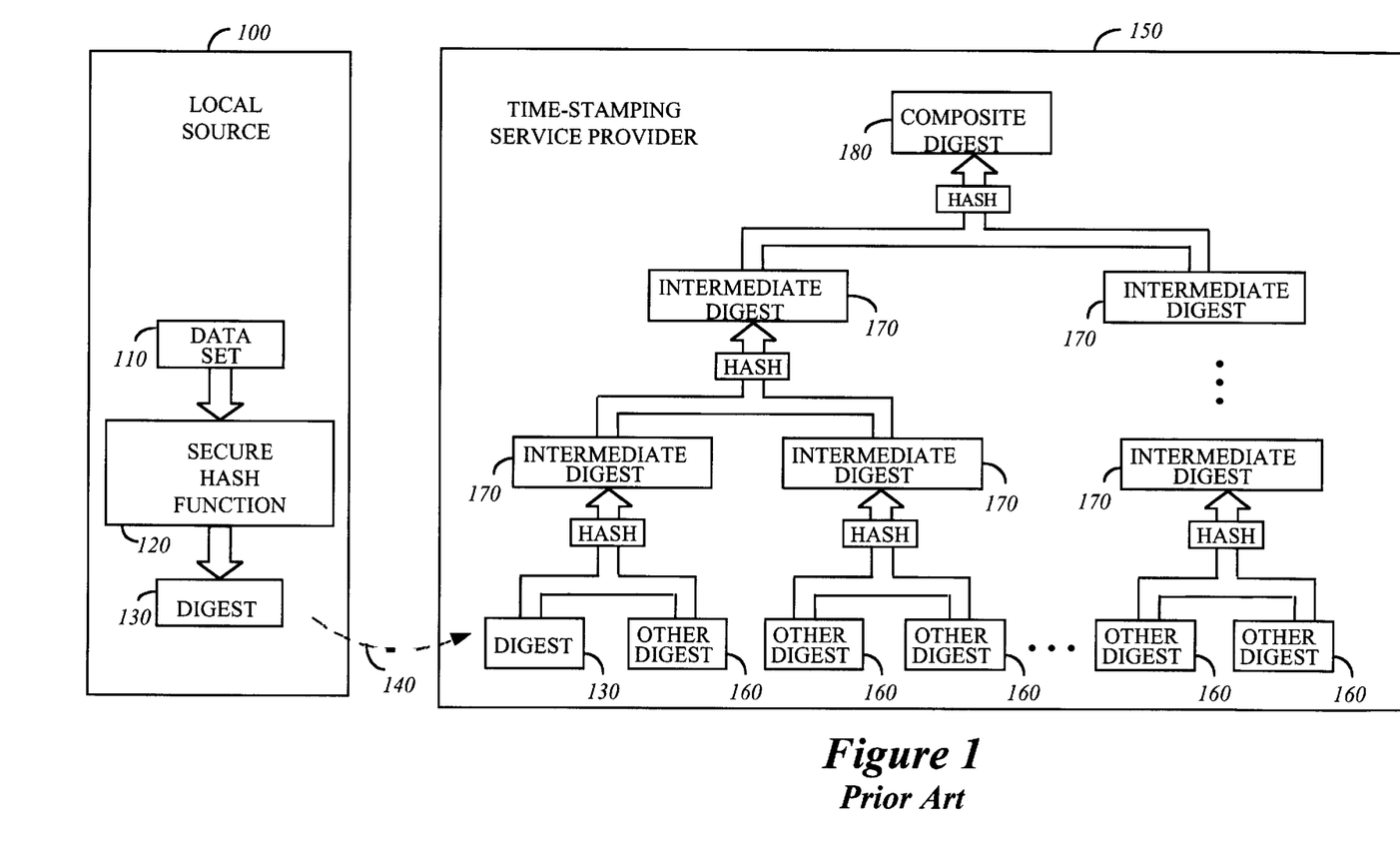
FIG. 1 is an illustrative flowchart of conventional time stamping operations undergone to produce a composite digest.

In an effort to preserve data integrity, a technique called "time stamping" has recently been developed and is commercially offered from Surety Technologies, Inc. of Chatham, N.J. Referring to FIG. 1, an example of time-stamping is shown in which a hash operation is initially performed on digital data 110. The hash operation involves a one-way hash function 120, normally stored within first source 100, mapping digital data 110 from its arbitrary size into a fixed size, usually referred to as a "digest" 130. The digest 130 cannot be manipulated to reproduce the data (i.e., no information content). Examples of the hash function 120 include, but are not limited or restricted to those provided by RSA Data Security, Inc. of Redwood City, Calif. (e.g., "MD5"), or those published by the U.S. Government (e.g., "Secure Hash Algorithm").

As indicated by a dotted line 140, a conscious effort is made by a person to electrically download the digest 130 by a telephone line to a time-stamping service provider 150. The digest 130 is hashed and combined with a number of other digests 160 from different sources in a "binary tree" fashion. This results in a composite digest 180 produced from "intermediate digests" 170. Next, the composite digest 180 is widely published (e.g., printed in a publication, disseminated to all sources, stored in a trusted database, etc.) to establish that data 110 existed at least before the publication of the composite digest 180.

However, there is no current mechanism for protecting the integrity of data by ensuring that it was created or existed after a particular point in time as well as before publication of the composite digest. By providing a technique ("time-bracketing"), which ensures that data was created or existed after a particular point in time, fraudulent modification or substitution of a previously captured data clip would be prevented. Hence, there exists a need for an electronic device, employed within a capturing device and coupled with communication circuitry, which would preclude a captured data clip from being altered without subsequent detection by using standard communication schemes with the time-stamping service provider.

BRIEF SUMMARY OF THE INVENTION

The present invention relates to an electronic device comprising a data capture circuit and a cryptographic circuit. The data capture circuit is designed to capture a data clip. The cryptographic circuit preserves the integrity of the data clip by establishing that the data clip was captured after publication of information including a state value. The cryptographic circuit includes a processor and a communication circuit that establishes a communication link with a time stamping service provider and/or another data provider.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to an electronic device, preferably employed in a capturing device and its corresponding method of operation. In the following description, some terminology is used to discuss certain well-known cryptographic functions. For example, the term "incorporated" (and other tenses) should be broadly construed as combining data according to any bit manipulation including addition, concatenation, concurrent hashing, and the like. A "data clip" is information digitized into binary data acquired for display as video or text, or for playback as audio. This information includes at least one data frame. A "key" is an encoding and/or decoding parameter used by conventional cryptographic functions such as public-key cryptographic function (e.g., Rivest, Shamir and Adleman "RSA" and other types), or a symmetric key cryptographic function (e.g., Data Encryption Algorithm "DEA" and other types). A "certificate" is defined as any digital information (including a key) associated with an entity, encrypted by a private key held by another entity such as a manufacturer or a widely published trusted authority (e.g., bank, governmental entity, trade association, etc.). A "digital signature" is similar to a certificate, but is normally used for authenticating data, not its sender.

The spirit and scope of the present invention broadly pertains, regardless of selected implementation, on a capturing device supporting two operations. The first operation is to capture data clip(s). The second operation is to ensure secure transmission of information associated with the captured data clip(s), a state value (described below), and/or any other desired information to or from a time-stamping service provider.

Figure 2:
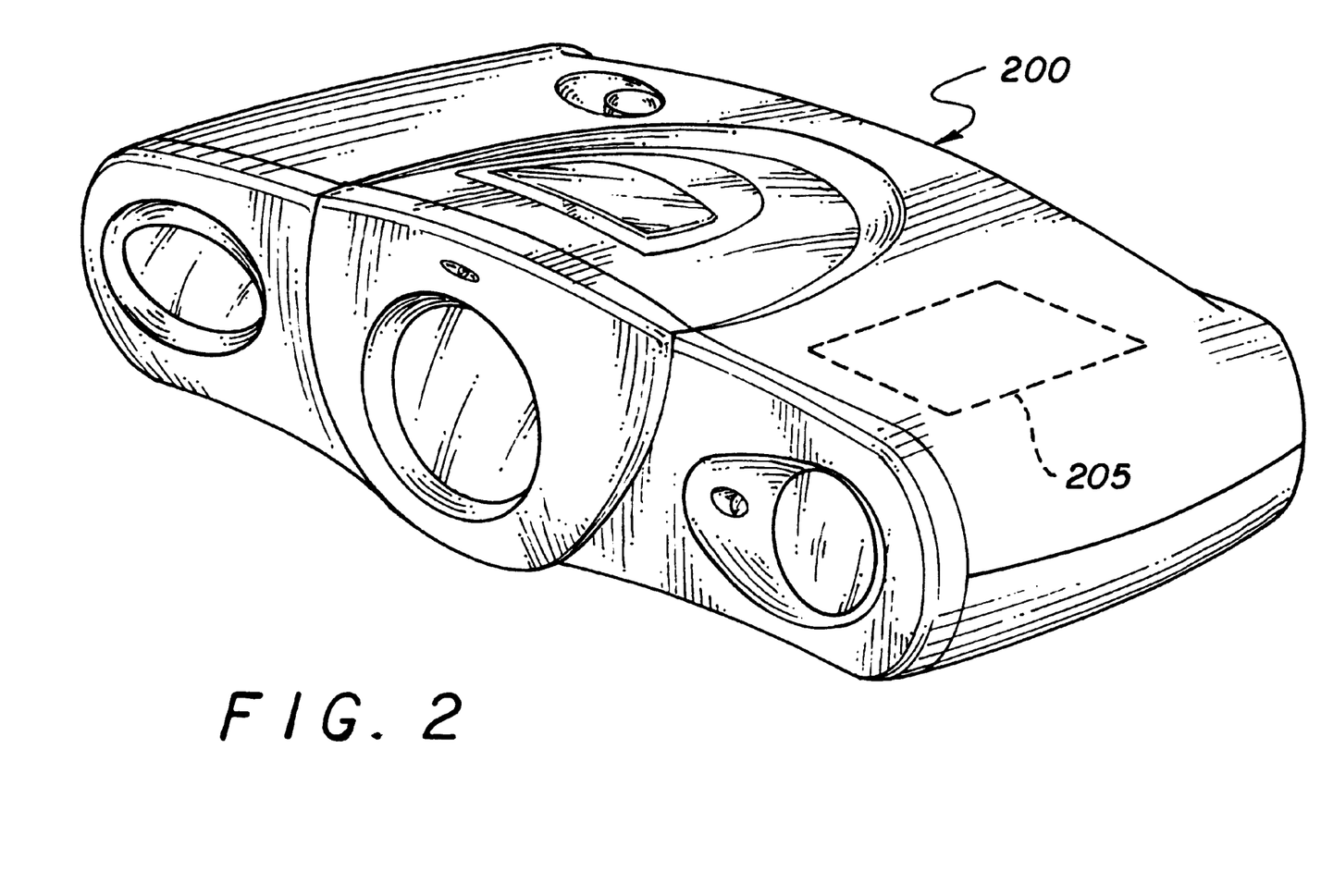
FIG. 2 is an illustrative block diagram of an embodiment of a capturing device employing an electronic device.

Referring now to FIG. 2, an illustrative embodiment is shown of a capturing device 200 employing the present invention. The capturing device 200 may include, but is not limited or restricted to a digital still camera, a digital video camera or any other type of device or combination of devices that is capable of capturing a data clip and transferring variations of the data clip for time-stamping purposes. The capturing device 200 includes an electronic device 205 which is capable of capturing the data clip of desired data (e.g., sensory features of a person, place or thing including a visual image, a portion of audio, etc.), and thereafter, storing the contents of the data clip within its internal memory. In this type of embodiment, the electronic device 205 is one or more integrated circuit ("IC") components that, individually or collectively, digitally sign the data clip before storage. It is contemplated that the electronic device 205 may be a collection of discrete logic capable of performing the functionality discussed below which are integrated at a board level (e.g., printed circuit board or a daughter card).

Figure 3:
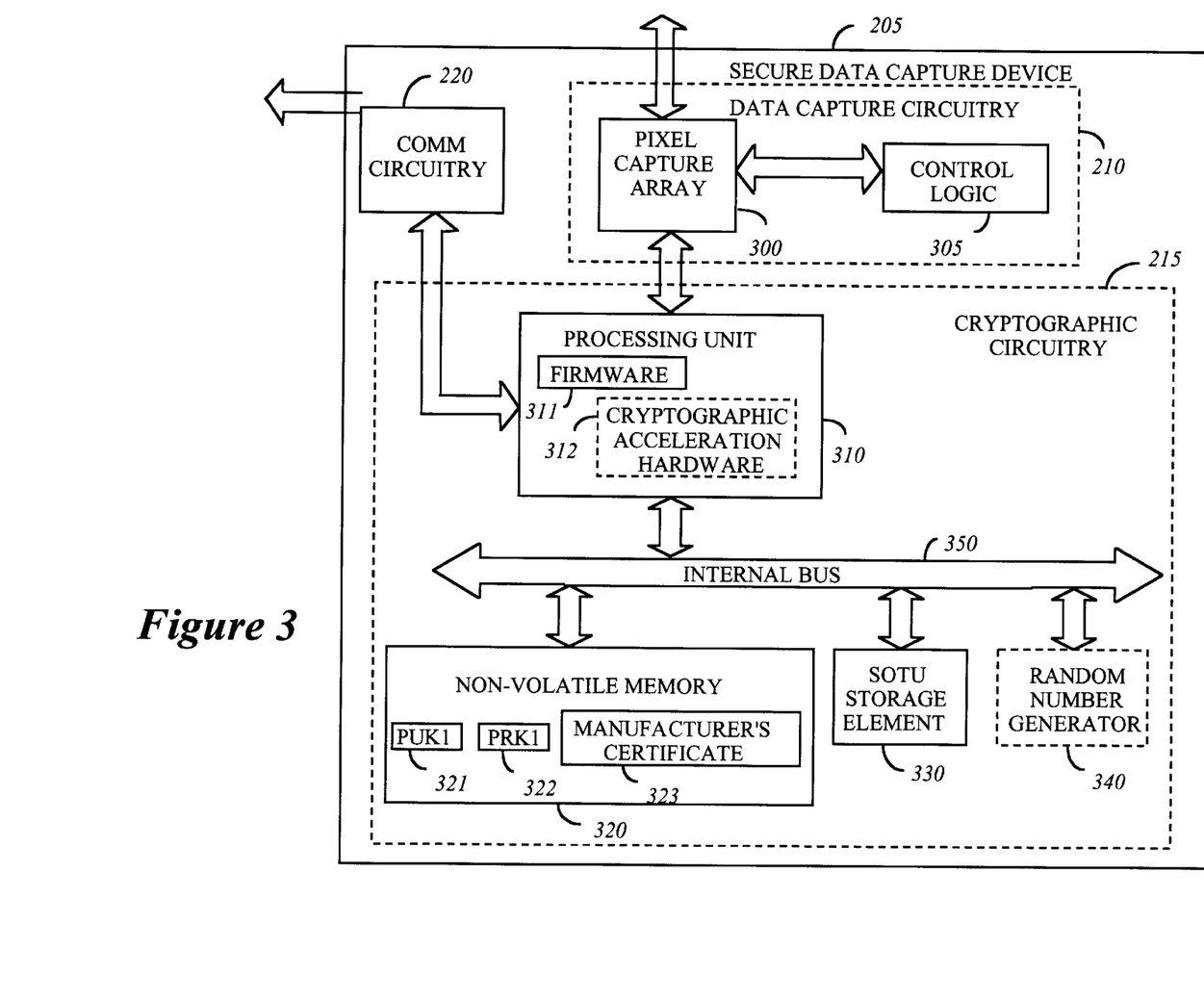
FIG. 3 is an illustrative block diagram of an embodiment of the electronic device.

Referring to FIG. 3, one embodiment of the electronic device 205 of FIG. 2 is shown. The electronic device 205 comprises data capture circuitry 210, cryptographic circuitry 215, and communication circuitry 220, all of which may be integrated into a multiple IC assembly or a single IC component to reduce vulnerability to physical tampering. Likewise, in lieu of integrated circuit technology, the circuitry 210–220 may be formed through discrete logic or a combination of discrete logic and integrated circuits. Thus, this circuitry 210–220 may be implemented into a single IC package, a multi-chip module, or more than one package at a board level.

In this embodiment, data capture circuitry 210 may include an image sensor such as, for example, a Charge Coupled Device "CCD" (the standard sensor used in camcorders) or any other sensor technology. In general, data capture circuitry 210 includes a pixel capture array 300 and control logic 305 controlling the pixel capture array 300.

Implemented onto the same silicon as the data capture circuitry 210, or perhaps different silicon if desired, the cryptographic circuitry 215 comprises a processing unit 310 coupled to a number of elements through an internal bus 350. These elements include, but are not limited to a nonvolatile memory 320 (e.g., erasable programmable read only memory "EPROM", electrically erasable programmable read only memory "EEPROM", video read only memory "VROM", flash memory, etc.), a State of the Universe (SOTU) storage element 330 and, optionally, a random number generator 340.

The processing unit 310 includes firmware 311 (e.g., in flash memory, read-only memory "ROM", random access memory "RAM" and the like) for execution of the public-key cryptographic function in digitally signing information as well as performing hash operations and storing a running hash value (described below). Optionally, cryptographic acceleration hardware 312 may be employed into the processing unit 310 as denoted by the dotted line representation.

The non-volatile memory 320 may be implemented to store a unique public/private key pair 321 and 322 associated with this electronic device 205 and a manufacturer's certificate 323 for authentication purposes. The internal storing of the unique public/private key pair 321 and 322 permits the captured data clip to be encrypted and/or digitally signed within the electronic device 205 prior to transmission from the processing element 310 to another processor or storage device remotely located in the source. Moreover, this unique public/private key pair 321 and 322 and manufacturer's certificate 323 allow a remotely located system (e.g., PC platform) to uniquely identify the capturing device, authenticate it with a challenge/response protocol and, if desired, establish a symmetric "session" key to support symmetric key cryptography to reduce the latency in encrypting and decrypting the data. As a result, it is virtually infeasible to tap into the communication path between two sources and substitute a prior recorded clip or alter the captured data clip without being detected by a receiving source.

The SOTU storage element 330 (e.g., RAM, flash memory, register(s), etc.) may be implemented to support information of a wide variety of bit sizes. For example, the SOTU storage element 330 may be constructed to store many bits of data representing a large number. The SOTU storage element 330 is loaded with state information (referred to as the "state value") from outside the electronic device 205 by either the communication circuitry 220 initiating an electrical, optical, magnetic or wireless connection with an external source or initiation being conducted by the external source. Establishing the link may be based on an automatic, periodic basis or in response to an action (e.g., turning on the capturing device 200). The external source may be a time-stamping service provider or any other entity with responsibility in generating and in regulating disbursement of state values.

The state value may be reloaded into the SOTU storage element 330 at any time prior to the capturing of a data clip if time-bracketing is being performed. The state value can be loaded in a number of different situations such as on a periodic basis (e.g., every few minutes, hour, day), when the capturing device is initially powered and the like. The state value is derived at a particular point in time and in such a way as to be unpredictable at any time prior to that point. For example, the state value may be a composite digest which is a hash value of many data sets which is virtually unpredictable prior to the moment of its publication by the time stamping service provider. In general terms, the state value is a random number normally having a bit width greater than 1275 bits, although any bit width may be used. This SOTU storage element 330 may or may not be cleared at power down.

The random number generator 340 is used to generate the unique public and private keys in a secure environment. Its use is preferable, but optional (as denoted by dotted line representation), depending on whether cryptographic functionality is desired.

In this embodiment communication circuitry 220 contains logic required to initiate a cellular phone call, to conform to billing requirements, as well as to transmit and receive a limited amount of digital information. Audio communications and other functionality do not need to be supported by communication circuitry 220, although they could be an optional feature. Examples of the features of this logic include, but are not be restricted or limited to an antenna, front-end circuitry and the like. Thus, it is contemplated that the logic usually found on cellular phones may be simply integrated into the electronic device 205 by merely establishing an interface between communication circuitry 220 and processing unit 310 of the cryptographic circuitry 215. Well-known in the art and implemented in most cellular phones, this logic would provide convenience in use and a cost-effective solution in transferring and receiving information for time bracketing (described below).

Although not shown, it is contemplated that other embodiments may be used to practice the present invention. For example, in lieu of integrating the communication circuitry 220 into the electronic device 205, a cellular phone having communication circuitry 220 may be modified to include an input/output ("I/O") port that supports data transport and a command interface to the capturing device 200 to allow the capturing device 200 to control the operations of the cellular phone. This interface would enable information to be exchanged between the I/O port of the cellular phone and the capturing device through a communication link. Likewise, the communication circuitry 220 may be modified to include an I/O port (e.g., a RJ-11 connector and modem) adapted with a standard communication circuitry for connection to Plain Old Telephone Service (POTS), or a network card (e.g., Local Area Network "LAN" card, Wide Area Network "WAN" card, etc.) to interconnect to an appropriate network.

Figure 4:
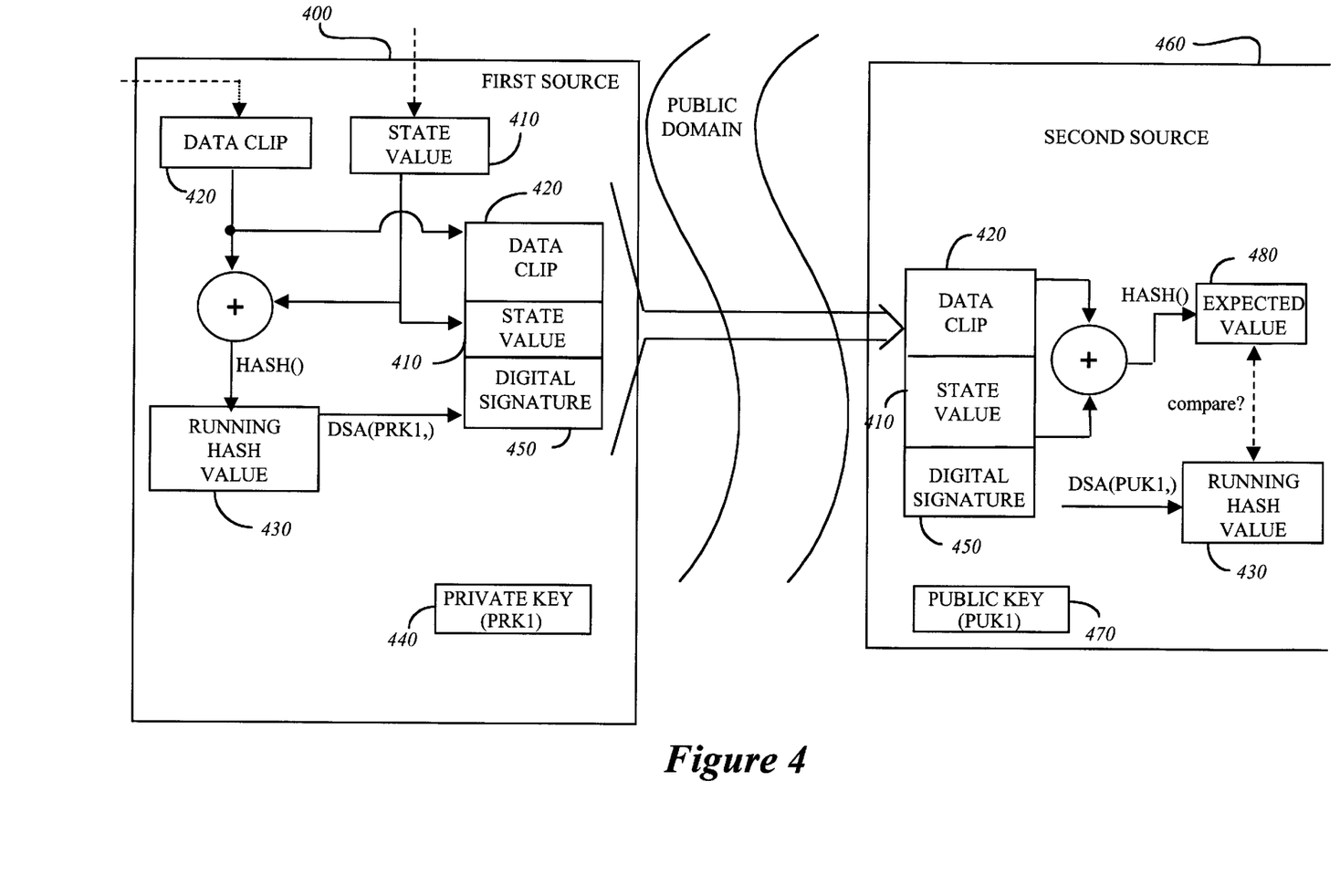
FIG. 4 is an illustrative block diagram of cryptographic operations performed by the capturing device.

Referring now to FIG. 4, a block diagram illustrates one sequence of operations performed to preserve data integrity. The first source 400 (e.g., capturing device 200 of FIG. 2) is powered on. Before the first source 400 begins capturing a data clip, it is necessary for a current state value to be loaded into internal memory of the first source 400. Obtained from an external source (not shown), the state value 410 is used to provide proof that a data clip 420 was captured after a certain point in time because the state value 410 is periodically changed (e.g., possibly every second, minute, hour, day, etc.) and is unpredictable. It is also preferred that a running hash value 430, generally a continuously updated hash value, is reset. This may be accomplished by loading an initial bit value into a particular location in memory of the first source 400, such as non-volatile memory 320 of the electronic device 205 (see FIGS. 2–3) if first source 400 is the capturing device. The running hash is continuously updated prior to transmission for time stamping.

Thereafter, first source 400 captures data clip 420. The data clip 420 undergoes a "hash" operation by executing a hash function within the first source 400. This causes the data clip 420 to be mapped from its arbitrary size into a digest loaded into the running hash value 430 preferably stored within first source 400. Additionally, the state value 410 is incorporated into the running hash value 430 as shown. One technique is simply concatenating the state value to the data clip as it is processing through the hash function to produce the running hash value. Another technique is adding the state value and the running hash value to produce a result, and performing a hash function on the result. A number of techniques may be used besides those described.

To provide time-bracketing functionality, the running hash value is transmitted to a time-stamping service provider via communication circuitry integral to or adapted for use by the first source 400. The time-stamping service provider performs the standard operations described in FIG. 1, establishing the time at which the running hash value was submitted.

Prior to transmission of the data clip and related information to a second source 460 (e.g. an insurance company, a time-stamping service provider and the like) via communication circuitry integral to or adapted for use by the first source 400, the running hash value 430 is digitally signed, using a Digital Signaturing Algorithm (DSA) along with a private key (PRK1) 440 of the first source 400, to produce a digital signature 450. The digital signature 450 is transmitted along with the state value 410 and data clip 420, which may or may not be encrypted. The digital signature 450 will enable the second source 460 to determine that (i) the data clip has not been tampered with during transmission and (ii) the running hash value originated from the first source 400. It is contemplated that transmission of the state value 410, data clip 420 and digital signature 450 may be simultaneous or sequential.

The second source 460 decrypts the digital signature 450 using a public key (PUK1) 470 of the first source 400 to recover the digitally signed running hash value. The second source 460 also performs a hash function on the received data clip 420 and state value 410 to produce the expected value 480 of the running hash value 430. PUK1 470 may be provided by the first source 400 through any of a number of techniques such as transmission of a digital certificate (not shown) or pre-stored within second source 460. Both techniques are well-known in the art. The second source 460 can determine whether any of the transmitted data has been modified through comparison with the running hash value 430 obtained from the digital signature 450 and the running hash value (RHV) computed from data clip 420 and state value 410 transmitted with the digital signature 450.

Figure 5:
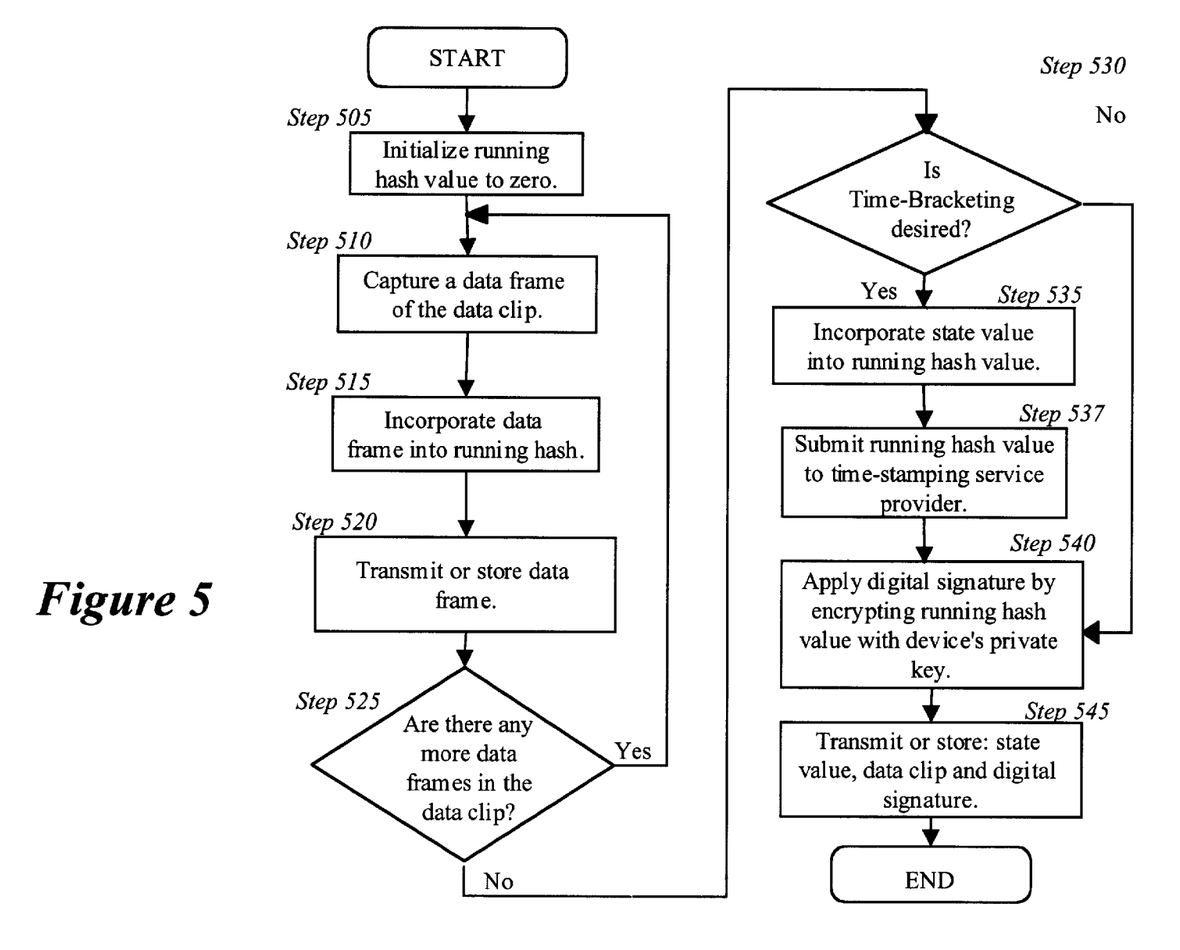
FIG. 5 is an illustrative flowchart showing those procedural steps undertaken by the electronic device in protecting the integrity of a captured data clip through time-bracketing.

Referring now to FIG. 5, the operations performed by the electronic device in transmitting secured data to the second source is illustrated. The SOTU storage element contains the state value preferably received upon establishing a point-to-point communication between the time-stamping service provider, (for example) and the communication circuitry of the capturing device. It is contemplated that distribution of the state value may be accomplished by some other broadcast scheme rather than point-to-point communications such as satellite based systems (e.g., Digital Satellite System, Global Positioning System, etc.).

The state value cannot be changed once the data clip is captured (block 510) the state value would be integrated with the captured data clip during creation of the running hash value. In other words, FIG. 5 represents an "atomic" process during which the contents of the SOTU storage element are not modifiable. In addition, to avoid modification of the state value within SOTU storage element through physical tampering, a number of mutually inclusive, tamper resistance techniques may be performed on the electronic device. One technique is to integrate the cryptographic circuitry within the same silicon as the data capture circuitry. Another technique is to implement the electronic device within a single package. Another technique would involve a well-known process of deleting the private key associated with the electronic device if the package containing the state value is opened or even if the casing surrounding the cryptographic circuitry is opened. Also, the capturing device may be configured without an input port to prevent viruses and other software mechanisms for corrupting the capturing device.

Prior to capturing a data clip, an internally-stored "running hash" value is initialized to zero at block 505. The running hash is a continuously updated hash value stored within the capturing device prior to transmission for time stamping. At block 510, a data clip is captured by the sensor of the device (e.g., the pixel sensor array of a CCD or perhaps a CMOS sensor). Thereafter, a hash operation is performed on the data clip to produce a hash result and incorporated within the running hash value (block 515). In the case of single data frame capture, the running hash value will represent only the hash of a data frame, since no data frames will have been previously incorporated into this running hash value.

Next, the data frame may be transmitted to the time-stamping service provider or stored externally (block 520) if desired. Additionally, the data frame may be optionally encrypted (for privacy purposes) prior to such transmission or storage. If the data clip having multiple data frames is being captured, where a signature is not required on each individual data frame, and more frames are to be captured as part of the data clip, another data frame associated with the data clip is captured, hashed and incorporated with the current running hash value (block 525). It is contemplated that in lieu of serial hash operations on each data frame, a single hash operation on multiple data frames may be used to produce the running hash value. If no more frames are to be included in the data clip, or only the data clip is a single data frame, then the process continues to block 530.

At block 530, a decision is made as to whether the data clip is to be time-bracketed using the state value contained in the SOTU storage element. If so, the state value is incorporated in the running hash value during this capturing process at block 535. In block 537, the running hash value is submitted to the time-stamping service provider. In block 540, the running hash value is digitally signed using the private key of the capture device. Finally, in block 545, the state value, the data clip, and digital signature are transmitted to or stored within the second source. Such transmission or storage may be on an automatic, periodic basis during an on-going image capture or triggered by an action (e.g., turning off the capturing device).

The data clip, state value and/or digital signature may be then analyzed at the second source to determine validity as shown in FIG. 4.

It is contemplated that this time-bracketing technique cannot be used effectively when the operations of capturing the data clip and digitally signing the data clip are not atomic (e.g., the operations are independent). After these operations are completed, the state value may be reloaded. The reason is that if the data clip is available to software or other inherently insecure data handling systems, one cannot be sure that the data clip was not created at an earlier point in time and thereafter, the state value inserted before the digital signature is performed. The salient feature is that communication circuitry (or equivalent embodiments) enables communication of the contents of the SOTU storage element which are established prior to the data clip capture. The SOTU storage element may not (by device design) be loaded after Step 510.

Figure 6:
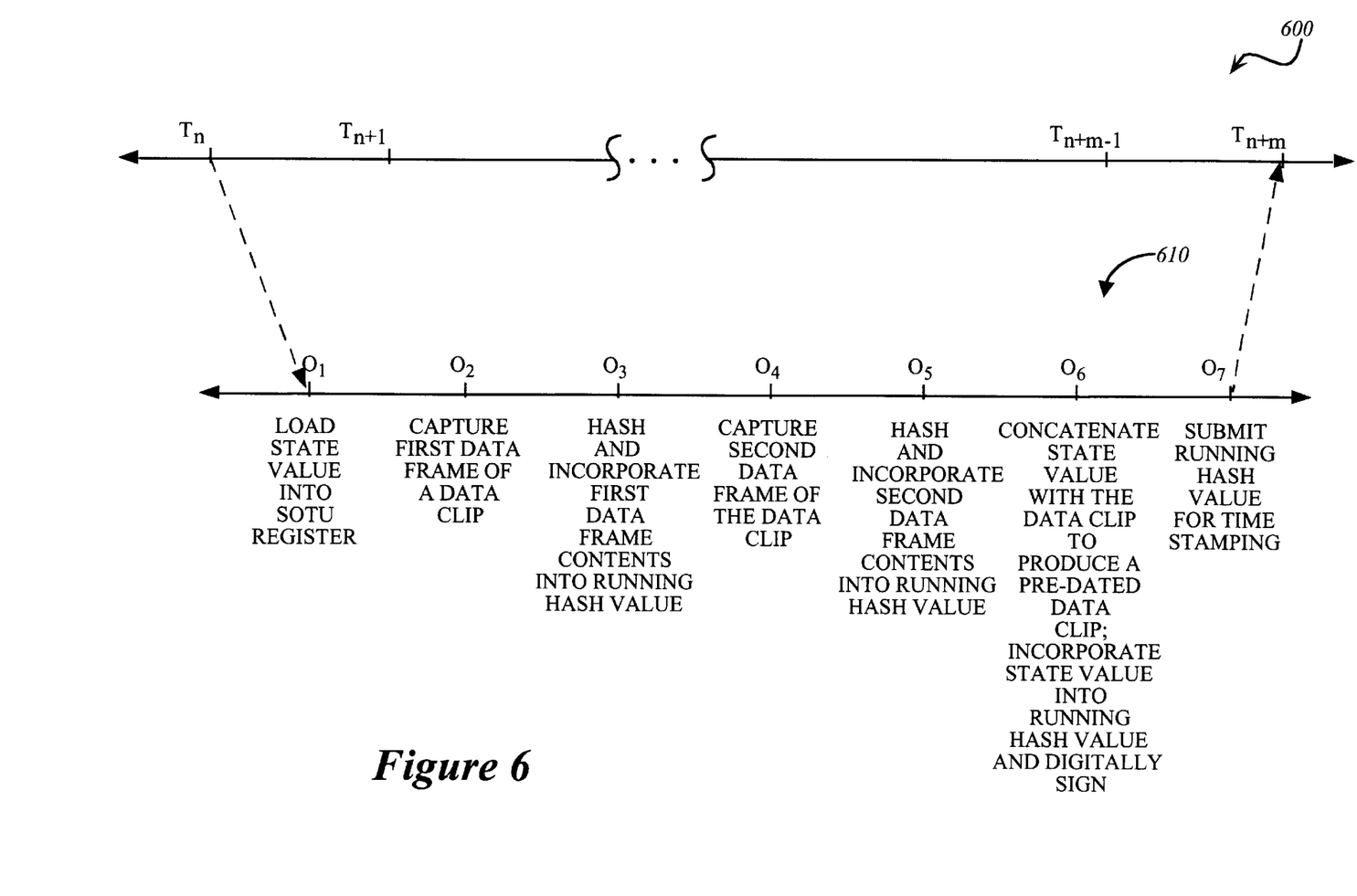
FIG. 6 is an illustrative timing flowchart showing how a data clip is time-bracketed between two points in time.

Referring to FIG. 6, an illustrative timeline of time-ordered events that provide time-bracketing of a captured data clip are shown. The timeline includes periodic time periods "T" representing cyclical publication dates occurring every second, minute, hour, day, week or any specific time duration. The operations are not required to occur at these time periods which are simply used for illustrative purposes. First, at time period "$O_1$" (after "$T_n$"), a state value is loaded into the SOTU storage element such as, for example, a published composite digest or a hash of an electronic version of a front page of a newspaper. It is infeasible to predict the value of either of these numbers substantially prior to their publication.

Thereafter, the capture of a first data frame of a data clip may commence at $O_2$, but once commenced, the SOTU storage element may not be loaded until the current operation has ended. After the first data frame is captured, the first data frame is hashed and incorporated as a running hash per $O_3$. This process is continued for a second data frame of the data clip (as shown in $O_4$–$O_5$) and any subsequent data frames forming the data clip.

At $O_6$, after all related capture operations are complete, the state value of the SOTU storage element is concatenated with the data clip to produce a pre-dated data clip. Moreover, the state value is incorporated into the running hash value which is digitally signed. Once the signing is completed, the SOTU storage element may be loaded in preparation for capturing the next data clip. It is contemplated, however, that the running hash value and its digital signature must be submitted to a time-stamping service provider to complete the time bracketing operation at $T_{n+m}$.

By designing the hardware such that the SOTU storage element cannot be loaded for use with a previously captured data clip, assurance is provided that any data clip signed with a particular state value must have been captured by the device after that state value was published (labeled time point "$T_n$" in FIG. 6). By submitting the running hash value to the time-stamp service provider, assurance is provided that the data clip must have been captured prior to that point in time (labeled time point "$T_{n+m}$" in FIG. 6). Thus, the captured data clip is "bracketed" in time to exist between time points $T_n$ and $T_{n+m}$.

While various embodiments of the invention have been described, those skilled in the art will realize that other embodiments of the invention are easily foreseeable without departing from the spirit and scope of the present invention. Moreover, well known circuitry and operational steps are not set forth in detail in order to avoid unnecessarily obscuring the present invention. The invention should, therefore, be measured in terms of the following claims.

What is claimed is:

1. An electronic device comprising:
   a data capture circuit to capture a data clip; and
   a cryptographic circuit coupled to the data capture circuit, the cryptographic circuit to preserve integrity of the data clip by establishing that the data clip was captured after publication of information including a state value, the cryptographic circuit including:
   a processor to perform operations on the data clip to produce a hash result, combines the state value with the hash result to produce a running hash value, and digitally signs the running hash value, and communication circuitry to establish a communication link to transmit at least the running hash value to undergo a time-stamping operation.

2. The electronic device of claim 1, wherein the communication circuitry supports wireless communications.

3. The electronic device of claim 1, wherein the data capture circuit includes a sensor.

4. The electronic device of claim 1, wherein the cryptographic circuit further includes at least one storage element.

5. The electronic device of claim 4, wherein the at least one storage element contains a unique key pair, the running hash value and the state value loaded prior to the data capture circuit capturing the data clip.

6. The electronic device of claim 5, wherein the cryptographic circuit further includes cryptographic software contained in the at least one storage element.

7. The electronic device of claim 4, wherein the at least one storage element includes a first storage element to contain a unique key pair;

a second storage element to contain the running hash value; and a third storage element to contain the state value.

8. The electronic device of claim 1, wherein the communication circuitry of the cryptographic circuit further enables the state value to be updated.

9. A data capture system comprising:

a first source to capture a data clip and preserve integrity of the data clip, the first source including a data capture circuit, and a cryptographic circuit coupled to the data capture circuit, the cryptographic circuit to preserve integrity of the data clip by establishing that the data clip was captured after publication of information including a state value, to perform operations on the data clip and the state value to produce a running hash value, and to digitally sign the running hash value; and a second source in communication with the first source.

10. The data capture system of claim 9, wherein the second source performing at least an authentication operation on information transmitted from the first source.

11. The data capture system of claim 9, wherein the data capture circuit of the first source includes a sensor.

12. The data capture system of claim 9, wherein the second source performs a time-stamping operation on information including the running hash value.

13. The data capture system of claim 9, wherein the cryptographic circuit of the first source includes communication circuitry to establish a wireless communication with at least the second source.

14. The data capture system of claim 13, wherein the cryptographic circuit of the first source further includes a processor coupled to the communication circuitry.

15. The data capture system of claim 14, wherein the cryptographic circuit of the first source further includes at least one storage element.

16. The data capture system of claim 15, wherein the at least one storage element of the cryptographic circuit contains a unique key pair, the running hash value and the state value loaded prior to the data capture circuit capturing the data clip.

17. The data capture system of claim 15, wherein the at least one storage element of the cryptographic circuit further includes cryptographic software.

18. The data capture system of claim 15, wherein the at least one storage element of the cryptographic circuit includes a first storage element to contain a unique key pair;

a second storage element to contain the running hash value; and a third storage element to contain the state value.

19. A method for preserving integrity of a data clip transmitted from a first source to a second source, the method comprising:

capturing a first data clip;

performing a hashing operation on at least the first data clip to produce a running hash value;

digitally signing the running hash value to produce a digital signature of the running hash value;

transferring at least the digital signature to the second source through wireless communications; and performing one of a time-stamping operation and an authentication operation on at least the running hash value by the second source.

20. The method of claim 19, wherein the performing the hash operation includes concatenating a state value to the first data clip; and hashing the state value and first data clip to produce the running hash value.

21. The method of claim 19, wherein the performing the hash operation includes:

performing a hashing operation on the first data frame to produce a first hash result;

incorporating the hash result with the running hash value;

concatenating a state value to the running hash value to produce a result; and performing a hashing operation on the result to produce the running hash value.

* * * * *

UNITED STATES PATENT AND TRADEMARK OFFICE
CERTIFICATE OF CORRECTION

PATENT NO.   : 5,966,446
DATED        : October 12, 1999
INVENTOR(S)  : Davis

It is certified that error appears in the above-identified patent and that said Letters Patent is hereby corrected as shown below:

Column 1,
Line 8, delete "1993", insert -- 1997 --.

Signed and Sealed this

Tenth Day of June, 2003

JAMES E. ROGAN
*Director of the United States Patent and Trademark Office*